(12) United States Patent
Sun

(10) Patent No.: US 12,485,899 B2
(45) Date of Patent: Dec. 2, 2025

(54) APPARATUS FOR DRIVING ASSISTANCE AND METHOD FOR DRIVING ASSISTANCE

(71) Applicant: HL Klemove Corp., Incheon (KR)

(72) Inventor: Shubo Sun, Yongin-si (KR)

(73) Assignee: HL Klemove Corp., Incheon (KR)

( * ) Notice: Subject to any disclaimer, the term of this patent is extended or adjusted under 35 U.S.C. 154(b) by 238 days.

(21) Appl. No.: 18/229,853

(22) Filed: Aug. 3, 2023

(65) Prior Publication Data

US 2024/0227811 A1 Jul. 11, 2024

(30) Foreign Application Priority Data

Jan. 5, 2023 (KR) ........................ 10-2023-0001938

(51) Int. Cl.
*B60W 30/18* (2012.01)
*B60W 50/029* (2012.01)

(52) U.S. Cl.
CPC .... *B60W 30/18163* (2013.01); *B60W 50/029* (2013.01); *B60W 2420/403* (2013.01); *B60W 2420/408* (2024.01); *B60W 2552/53* (2020.02); *B60W 2554/4026* (2020.02); *B60W 2554/4029* (2020.02)

(58) Field of Classification Search
CPC ......... B60W 30/18163; B60W 50/029; B60W 2050/021; B60W 2520/06; B60W 2556/50
See application file for complete search history.

(56) References Cited

U.S. PATENT DOCUMENTS

| | | | |
|---|---|---|---|
| 11,052,917 B2* | 7/2021 | Kim | B60W 50/029 |
| 11,787,408 B2* | 10/2023 | Sim | B60W 50/10 |
| | | | 701/28 |
| 11,845,435 B2* | 12/2023 | Yatagai | B60W 30/18159 |
| 2011/0054716 A1* | 3/2011 | Stahlin | G01S 19/45 |
| | | | 701/1 |
| 2014/0257686 A1* | 9/2014 | Feldman | B60W 30/18163 |
| | | | 701/300 |
| 2015/0134176 A1* | 5/2015 | Ham | B60W 50/082 |
| | | | 701/23 |
| 2015/0142244 A1* | 5/2015 | You | B60K 28/06 |
| | | | 701/23 |
| 2015/0321699 A1* | 11/2015 | Rebhan | B60W 30/18163 |
| | | | 701/23 |
| 2016/0311464 A1* | 10/2016 | Yamaoka | B62D 15/0255 |
| 2017/0072967 A1* | 3/2017 | Fendt | B60W 50/0225 |
| 2019/0138000 A1* | 5/2019 | Hammond | B60W 50/0205 |
| 2019/0179310 A1* | 6/2019 | Sakamoto | B60W 50/029 |

(Continued)

FOREIGN PATENT DOCUMENTS

JP 2021-128590 A 9/2021
KR 10-2019-0023550 A 3/2019

*Primary Examiner* — Phutthiwat Wongwian
*Assistant Examiner* — Brian R Kirby
(74) *Attorney, Agent, or Firm* — Harvest IP Law, LLP

(57) ABSTRACT

Disclosed herein is a driving assistance apparatus including a front sensor installed on a vehicle and having a field of sensing outside the vehicle, and a controller configured to process data acquired from a navigation device of the vehicle and data acquired from the front sensor, wherein the controller determines whether the navigation device fails, and determines, based on the data acquired from the front sensor, whether a travel road is a road on which a lane change assistance function is operable when the navigation device fails.

20 Claims, 9 Drawing Sheets

(56) References Cited

U.S. PATENT DOCUMENTS

| | | | | |
|---|---|---|---|---|
| 2019/0217868 | A1* | 7/2019 | Kim | B60W 50/029 |
| 2019/0300007 | A1* | 10/2019 | Hilligardt | B60W 50/029 |
| 2019/0389465 | A1* | 12/2019 | Ogino | B60T 7/22 |
| 2021/0039667 | A1* | 2/2021 | Molin | B60W 60/0053 |
| 2021/0245759 | A1* | 8/2021 | Yonemura | G08G 1/22 |
| 2021/0269063 | A1* | 9/2021 | Lee | B60W 60/00186 |
| 2021/0362733 | A1* | 11/2021 | Yoon | H04N 17/00 |
| 2022/0017107 | A1* | 1/2022 | Shinoda | B60W 60/00186 |
| 2022/0177007 | A1* | 6/2022 | Nemoto | B60W 60/007 |
| 2022/0194407 | A1* | 6/2022 | Fukaya | B60Q 1/52 |
| 2022/0289238 | A1* | 9/2022 | Wang | B60W 60/0017 |
| 2023/0294672 | A1* | 9/2023 | Kato | B60W 50/14 701/301 |

* cited by examiner

APPARATUS FOR DRIVING ASSISTANCE AND METHOD FOR DRIVING ASSISTANCE

CROSS-REFERENCE TO RELATED APPLICATION

This application claims the benefit of Korean Patent Application No. 10-2023-0001938, filed on Jan. 5, 2023 in the Korean Intellectual Property Office, the disclosure of which is incorporated herein by reference.

BACKGROUND

1. Field

Embodiments of the present disclosure relate to an apparatus for driving assistance and a method for driving assistance, which may assist a lane change based on whether a navigation device is out of order.

2. Description of the Related Art

Vehicles are the most common transportation in modern society, and the number of people using the vehicles is increasing. Although there are advantages such as easy long-distance traveling and convenience of living with the development of a vehicle technology, a problem that road traffic conditions are worse and traffic congestion becomes serious in densely populated places such as Korea often occurs.

Recently, research on vehicles equipped with an advanced driver assist system (ADAS) for actively providing information on a vehicle state, a driver state, and/or a surrounding environment in order to reduce a driver's burden and enhance convenience is actively progressing.

As examples of ADASs mounted on vehicles, there are lane departure warning (LDW), lane keeping assist (LKA), high beam assist (HBA), autonomous emergency braking (AEB), traffic sign recognition (TSR), adaptive cruise control (ACC), blind spot detection (BSD), etc.

An ADAS may collect information on the surrounding environment and process the collected information. In addition, the ADAS may recognize objects and design a route for the vehicle to travel based on a result of processing the collected information.

However, the conventional ADASs have a problem that when a navigation device is abnormal upon assisting a lane change, the ADAS may not provide the corresponding function.

SUMMARY

Therefore, it is an aspect of the present disclosure to provide a driving assistance apparatus and a driving assistance method, which may determine whether it is a road on which a lane change assistance function may be provided based on information acquired from a sensor capable of detecting an object in front of a vehicle when a navigation device is in an abnormal state.

Additional aspects of the disclosure will be set forth in part in the description which follows and, in part, will be obvious from the description, or may be learned by practice of the disclosure.

In accordance with one aspect of the present disclosure, an apparatus for driving assistance includes a front sensor installed on a vehicle and having a field of sensing outside the vehicle, and a controller configured to process data acquired from a navigation device of the vehicle and data acquired from the front sensor. The controller determines whether the navigation device fails, and determines, based on the data acquired from the front sensor, whether a travel road is a road on which a lane change assistance function is operable when the navigation device fails.

The front sensor may include a camera installed on the vehicle, having a field of view outside the vehicle, and configured to acquire image data, and a radar installed on the vehicle, having a field of sensing outside the vehicle, and configured to acquire radar data.

The controller may determine whether two or more lane lines are present on a road in a traveling direction based on the data acquired from the front sensor.

The controller may determine whether at least one of a pedestrian or a cyclist is present on the travel road based on the data acquired from the front sensor.

The controller may determine whether a road in a direction opposite to a direction of the travel road is separated from the travel road based on the data acquired from the front sensor.

The controller may determine that the travel road is the road on which the lane change assistance function is operable when it is determined that two or more lane lines are present on the travel road, there is no pedestrian and no cyclist on the travel road, and a road in a direction opposite to a direction of the travel road is separated from the travel road based on the data acquired from the front sensor.

The controller may maintain, based on road state information determined before a failure of the navigation device, a road state according to the road state information as a state of the travel road for a predetermined time when the navigation device fails.

The controller may determine, based on the data of the navigation device, whether the travel road is the road on which the lane change assistance function is operable when the navigation device is normal.

The controller may determine that the travel road is the road on which the lane change assistance function is operable when it is determined that two or more lane lines are present on the travel road based on the data of the navigation device when the navigation device is normal and it is determined that there is no pedestrian or cyclist on the travel road and a road in a direction opposite to a direction of the travel road is separated from the travel road based on the data acquired from the front sensor.

The controller may perform control for lane change assistance when it is determined that the travel road is the road on which the lane change assistance function is operable.

In accordance with another aspect of the present disclosure, a method for driving assistance includes acquiring data from a navigation device of a vehicle, acquiring data through a front sensor having a field of sensing outside the vehicle, determining whether the navigation device fails based on the data acquired from the navigation device, and determining, based on the data acquired from the front sensor, whether a travel road is a road on which a lane change assistance function is operable when the navigation device fails.

The front sensor may include a camera installed on the vehicle, having a field of view outside the vehicle, and configured to acquire image data, and a radar installed on the vehicle, having a field of sensing outside the vehicle, and configured to acquire radar data.

The determining of whether the travel road is the road on which the lane change assistance function is operable may include determining whether two or more lane lines are present on the travel road based on the data acquired from the front sensor.

The determining of whether the travel road is the road on which the lane change assistance function is operable may include determining whether at least one of a pedestrian or a cyclist is present on the travel road based on the data acquired from the front sensor.

The determining of whether the travel road is the road on which the lane change assistance function is operable may include determining whether a road in a direction opposite to a direction of the travel road is separated from the travel road based on the data acquired from the front sensor.

The determining of whether the travel road is the road on which the lane change assistance function is operable may include determining that the travel road is the road on which the lane change assistance function is operable when it is determined that two or more lane lines are present on the travel road, there is no pedestrian or cyclist on the travel road, and a road in a direction opposite to a direction of the travel road is separated from the travel road based on the data acquired from the front sensor.

The determining of whether the travel road is the road on which the lane change assistance function is operable may include maintaining, based on road state information determined before a failure of the navigation device, a road state according to the road state information as a state of the travel road for a predetermined time when it is determined that the navigation device fails.

The determining of whether the travel road is the road on which the lane change assistance function is operable may include determining based on the data of the navigation device whether the travel road is the road on which the lane change assistance function is operable when the navigation device is normal.

The determining of whether the travel road is the road on which the lane change assistance function is operable may include determining that the travel road is the road on which the lane change assistance function is operable when it is determined that two or more lane lines are present on the travel road based on the data of the navigation device when the navigation device is normal and it is determined that there is no pedestrian or cyclist on the travel road and a road in a direction opposite to a direction of the travel road is separated from the travel road using the data acquired from the front sensor.

The method may further include performing control for lane change assistance when it is determined that the travel road is the road on which the lane change assistance function is operable.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
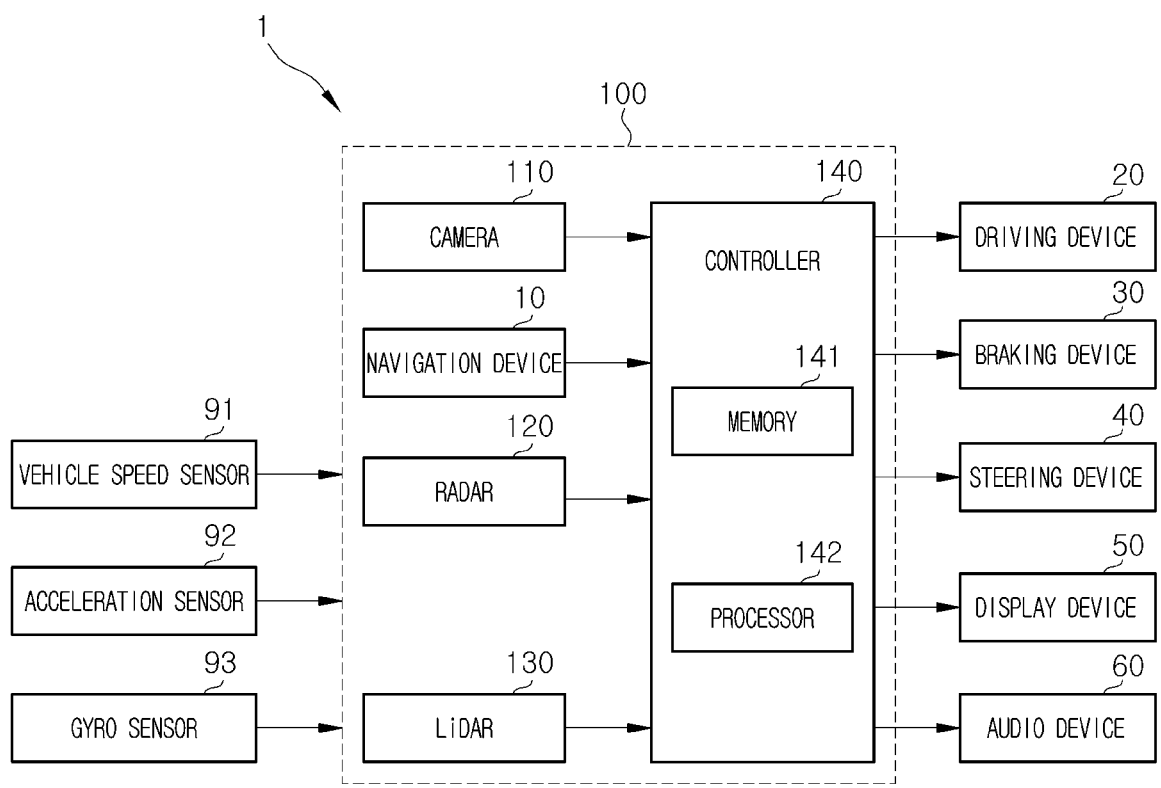
FIG. 1 is a view illustrating configurations of a vehicle and a driving assistance apparatus according to one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
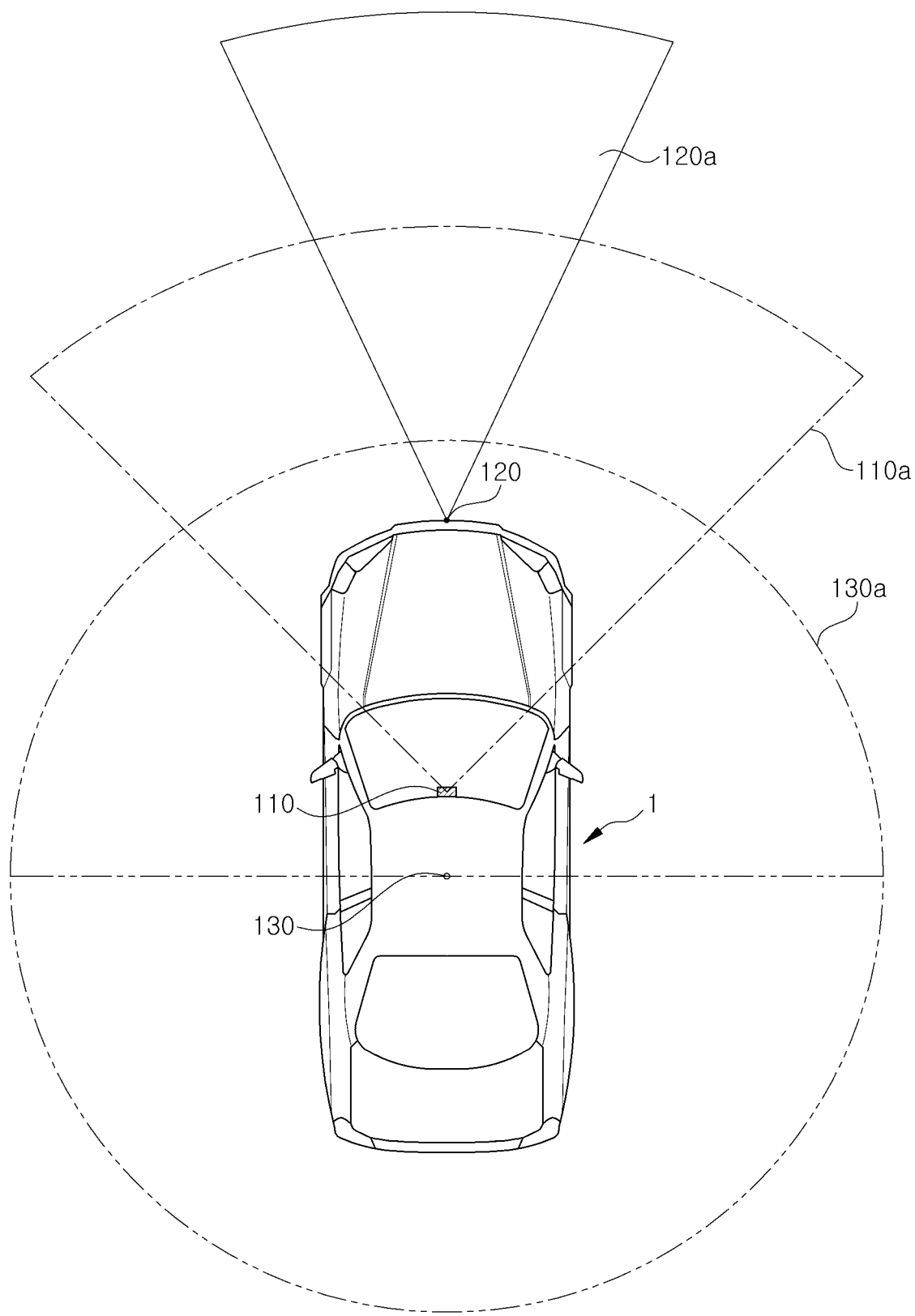
FIG. 2 is a view illustrating fields of view of a camera, a radar, and a light detection and ranging (LiDAR) included in the driving assistance apparatus according to one embodiment.

FIG. 1 is a view illustrating a configuration of a vehicle according to one embodiment. FIG. 2 is a view illustrating fields of view of a camera, a radar, and a light detection and ranging (LiDAR) included in the driving assistance apparatus according to one embodiment.

As illustrated in FIG. 1, a vehicle 1 may include a driving device 20, a braking device 30, a steering device 40, a display device 50, an audio device 60, and/or a driving assistance apparatus 100. In addition, the vehicle 1 may further include sensors 91, 92, and 93 for detecting a dynamic of the vehicle 1. For example, the vehicle 1 may further include a vehicle speed sensor 91 for detecting a longitudinal speed of the vehicle 1, an acceleration sensor 92 for detecting a longitudinal acceleration and a transverse acceleration of the vehicle 1, and/or a gyro sensor 93 for detecting a yaw rate, a roll rate, and a pitch rate of the vehicle 1.

The above components may communicate with one another via a vehicle communication network NT. For example, the electric devices 10, 20, 30, 40, 50, 60, 91, 92, 93, and 100 included in the vehicle 1 may transmit and receive data via Ethernet, media oriented systems transport (MOST), Flexray, a controller area network (CAN), a local interconnect network (LIN), etc.

The driving device 20 may move the vehicle 1 and include, for example, an engine, an engine management system (EMS), a transmission, and a transmission control unit (TCU). The engine may generate power for the vehicle 1 to travel, and the EMS may control the engine in response to a driver's acceleration intention conveyed through an accelerator pedal or a request of the driving assistance apparatus 100. The transmission may transmit the power generated by the engine to wheels for deceleration, and the TCU may control the transmission in response to a driver's transmission instruction conveyed through a transmission lever and/or a request of the driving assistance apparatus 100.

The braking device 30 may stop the vehicle 1 and include, for example, a brake caliper and a brake control module (EBCM). The brake caliper may decelerate the vehicle 1 or stop the vehicle 1 using friction with a brake disk, and the EBCM may control the brake caliper in response to a driver's braking intention conveyed through a brake pedal and/or a request of the driving assistance apparatus 100. For example, the EBCM may receive a deceleration request including a deceleration from the driving assistance apparatus 100 and electrically or hydraulically control the brake caliper so that the vehicle 1 decelerates depending on the requested deceleration.

The steering device 40 may include an electronic power steering control module (EPS). The steering device 40 may change a traveling direction of the vehicle 1, and the EPS may assist with an operation of the steering device 40 so that the driver may easily manipulate a steering wheel in response to the driver's steering intention conveyed through a steering wheel. In addition, the EPS may control the steering device in response to a request of the driving assistance apparatus 100. For example, the EPS may receive a steering request including a steering torque from the driving assistance apparatus 100 and control the steering device to steer the vehicle 1 depending on the requested steering torque.

The display device 50 may include a cluster, a head-up display, a center fascia monitor, and the like and provide various pieces of information and entertainments to the driver through images and sounds. For example, the display device 50 may provide traveling information of the vehicle 1, a warning message, and the like to the driver.

The audio device 60 may include a plurality of speakers and provide various pieces of information and entertainments to the driver through sounds. For example, the audio device 60 may provide traveling information of the vehicle 1, a warning message, and the like to the driver.

The driving assistance apparatus 100 may communicate with the navigation device 10, the plurality of sensors 91, 92, and 93, the driving device 20, the braking device 30, the steering device 40, the display device 50, and the audio device 60 via the vehicle communication network. The driving assistance apparatus 100 may receive information on a route to a destination and position information of the vehicle 1 from the navigation device 10 and acquire information on a vehicle speed, an acceleration, and/or an angular speed of the vehicle 1 from the plurality of sensors 91, 92, and 93.

The driving assistance apparatus 100 may provide various functions for the driver's safety or perform functions for autonomous driving. For example, the driving assistance apparatus 100 may provide lane departure warning (LDW), lane keeping assist (LKA), high beam assist (HBA), autonomous emergency braking (AEB), traffic sign recognition (TSR), adaptive cruise control (ACC), blind spot detection (BSD), highway driving assist (HDA), etc.

The driving assistance apparatus 100 may include the navigation device 10, a camera 110, a radar 120, a LiDAR 130, and a controller 140. The camera 110, the radar 120, and the LiDAR 130 may be referred to as front sensors for convenience of description below. In addition to the camera, the radar, and the LiDAR, any detector capable of detecting a forward state of a vehicle may be included in the front sensor without limitation.

The driving assistance apparatus 100 is not limited to that illustrated in FIG. 1. For example, at least one detector of the navigation device 10, the camera 110, the radar 120, and the LiDAR 130 may be omitted from the driving assistance apparatus 100 illustrated in FIG. 1 or various detectors capable of detecting nearby objects of the vehicle 1 may be added.

The navigation device 10 may generate a route to a destination input by a driver and provide the generated route to the driver. The navigation device 10 may receive a Global Navigation Satellite System (GNSS) signal from a GNSS and identify an absolute position (coordinates) of the vehicle 1 based on the GNSS signal. The navigation device 10 may generate the route to the destination based on the position (coordinates) of the destination input by the driver and a current position (coordinates) of the vehicle 1.

The navigation device 10 may provide map data and position information of the vehicle 1 to the driving assistance apparatus 100. In addition, the navigation device 10 may provide information on the route to the destination to the driving assistance apparatus 100.

For example, the navigation device 10 may provide the controller 140 with information on a distance to an access road for the vehicle 1 to enter another road, a distance to an exit road for the vehicle 1 to exit from the road on which the vehicle 1 currently travels, etc. The navigation device 10 may provide information on the characteristics of the travel road, for example, whether the travel road is an expressway or a highway, and the information may be used to determine whether the travel road is a road on which a lane change assistance function is operable.

The camera 110, the radar 120, the LiDAR 130, and the controller 140 may be provided separately from one another. For example, the controller 140 may be installed in a housing separated from a housing of the camera 110, a housing of the radar 120, and a housing of the LiDAR 130. The controller 140 may transmit or receive data with the camera 110, the radar 120, or the LiDAR 130 through a wide-bandwidth network.

In addition, at least some of the camera 110, the radar 120, the LiDAR 130, and the controller 140 may be integrally provided. For example, the camera 110 and the controller 140 may be provided in one housing, the radar 120 and the controller 140 may be provided in one housing, or the LiDAR 130 and the controller 140 may be provided in one housing.

The camera 110 may capture surroundings of the vehicle 1 and acquire image data of the surroundings of the vehicle 1. For example, as illustrated in FIG. 2, the camera 110 may be installed on a front windshield of the vehicle 1 and may have a forward field of view 110a of the vehicle 1.

The camera 110 may include a plurality of lenses and an image sensor. The image sensor may include a plurality of photodiodes for converting light into electrical signals, and the plurality of photodiodes may be disposed in the form of a two-dimensional matrix.

The image data may include information on another vehicle, a pedestrian, a cyclist, or a lane line (marker for distinguishing a lane) positioned near the vehicle 1.

The driving assistance apparatus 100 may include an image processor for processing the image data of the camera 110, and the image processor may be, for example, provided integrally with the camera 110 or integrally with the controller 140.

The image processor may acquire image data from an image sensor of the camera 110 and detect and identify nearby objects of the vehicle 1 based on a result of processing the image data. For example, the image processor may use image processing to identify whether the nearby object of the vehicle 1 is another vehicle, a pedestrian, a cyclist, etc.

The image processor may transmit information on the identified object near the vehicle 1 to the controller 140.

The radar 120 may transmit transmission radio waves toward the surroundings of the vehicle 1 and detect the nearby objects of the vehicle 1 based on reflected radio waves reflected from the nearby objects. For example, as illustrated in FIG. 2, the radar 120 may be installed on a grille or a bumper of the vehicle 1 and may have a forward field of sensing 120a of the vehicle 1.

The radar 120 may include a transmission antenna (or a transmission antenna array) for radiating transmission radio waves toward the surroundings of the vehicle 1 and a reception antenna (or a reception antenna array) for receiving reflected radio waves reflected from objects.

The radar 120 may acquire radar data from the transmission radio waves transmitted by the transmission antenna and the reflected radio waves received by the reception antenna. The radar data may include position information (e.g., distance information) and/or speed information of objects in front of the vehicle 1.

The driving assistance apparatus 100 may include a signal processor for processing the radar data of the radar 120, and the signal processor may be, for example, provided integrally with the radar 120 or integrally with the controller 140.

The signal processor may acquire the radar data from the reception antenna of the radar 120 and generate data on the dynamic of the object by clustering reflection points of the reflected signal. The signal processor may, for example, acquire a distance to the object based on a time difference between a transmission time of the transmission radio wave and a reception time of the reflected radio wave and acquire a speed of the object based on a frequency difference between the transmission radio wave and the reflected radio wave.

The signal processor may transmit data on the dynamic of the nearby object of the vehicle 1 acquired from the radar data to the controller 140.

The LiDAR 130 may emit light (e.g., infrared rays) toward the surroundings of the vehicle 1 and detect nearby objects of the vehicle 1 based on reflected light reflected from the nearby objects. For example, as illustrated in FIG. 2, the LiDAR 130 may be installed on a roof of the vehicle 1 and may have a field of view 130a in all directions from the vehicle 1.

The LiDAR 130 may include a light source (e.g., a light emitting diode, a light emitting diode array, a laser diode, or a laser diode array) for emitting light (e.g., infrared rays) and an optical sensor (e.g., a photodiode or a photodiode array) for receiving light (e.g., infrared rays). In addition, as necessary, the LiDAR 130 may further include a driving device for rotating the light source and/or the optical sensor.

While the light source and/or the optical sensor rotate, the LiDAR 130 may emit light through the light source and receive the light reflected from objects through the optical sensor, thereby acquiring LiDAR data.

The LiDAR data may include relative positions (distances and/or directions of nearby objects) and/or relative speeds of the nearby objects of the vehicle 1.

The driving assistance apparatus 100 may include a signal processor capable of processing the LiDAR data of the LiDAR 130, and the signal processor may be, for example, provided integrally with the LiDAR 130 or integrally with the controller 140.

The signal processor may generate data on the dynamic of the object by clustering the reflection points by the reflected light. The signal processor may, for example, acquire a distance to the object based on a time difference between a light transmission time and a light reception time. In addition, the signal processor may acquire a direction (or an angle) of the object with respect to a traveling direction of the vehicle 1 based on a direction in which the light source emits light when the optical sensor receives the reflected light.

The signal processor may transmit data on the dynamic of the nearby object of the vehicle 1 acquired from the LiDAR data to the controller 140.

The controller 140 may be electrically connected to the camera 110, the radar 120, and/or the LiDAR 130. In addition, the controller 140 may be connected to the navigation device 10, the driving device 20, the braking device 30, the steering device 40, the display device 50, the audio device 60, and/or the plurality of sensors 91, 92, and 93 via the vehicle communication network NT.

The controller 140 may process the data of the navigation device 10, the image data of the camera 110, the radar data of the radar 120, and/or the LiDAR data of the LiDAR 130 and provide control signals to the driving device 20, the braking device 30, and/or the steering device 40.

The controller 140 may include a processor 142 and a memory 141.

The memory 141 may store programs and/or data for processing the navigation data, the image data, the radar data, and/or the LiDAR data. In addition, the memory 141 may store programs and/or data for generating driving, braking, and steering signals.

The memory 141 may temporarily store the data received from the navigation device 10, the image data received from the camera 110, the radar data received from the radar 120, and the LiDAR data received from the LiDAR 130 and temporarily store results of processing the image data, the radar data, and/or the LIDAR data of the processor 142.

In addition, the memory 141 may include a high definition (HD) map. Unlike general maps, the HD map may include detailed information on surfaces of roads or intersections, such as lane lines, traffic lights, intersections, and traffic signs. In particular, landmarks (e.g., lane lines, traffic lights, intersections, and traffic signs) that vehicles encounters while traveling are implemented in the form of a three dimension on the HD map.

The memory 141 may include not only volatile memories such as a static random access memory (SRAM) and a dynamic RAM (DRAM) but also non-volatile memories such as a read only memory (ROM) and an erasable programmable ROM (EPROM).

The processor 142 may process the data of the navigation device 10, the image data of the camera 110, the radar data of the radar 120, and/or the LiDAR data of the LiDAR 130. For example, the processor 142 may fuse the image data, the radar data, and/or the LiDAR data and output fusion data.

Based on a result of processing the fusion data, the processor 142 may generate a driving signal, a braking signal, and/or a steering signal for respectively controlling the driving device 20, the braking device 30, and/or the steering device 40. For example, the processor 142 may evaluate risk of collision between fusion tracks and the vehicle 1. The processor 142 may predict the collision with the nearby object of the vehicle 1 using the fusion data and control the driving device 20, the braking device 30, and/or the steering device 40 to steer or brake the vehicle 1.

The processor 142 may include the image processor for processing the image data of the camera 110, the signal processor for processing the radar data of the radar 120 and/or the LiDAR data of the LiDAR 130, or a micro control unit (MCU) for generating driving, braking, and steering signals.

As described above, the controller 140 may provide the driving signal, the braking signal, or the steering signal based on the data of the navigation device 10, the image data of the external camera 110, the radar data of the radar 120, or the LiDAR data of the LiDAR 130.

A detailed operation of the driving assistance apparatus 100 will be described below in more detail.

Figure 3:
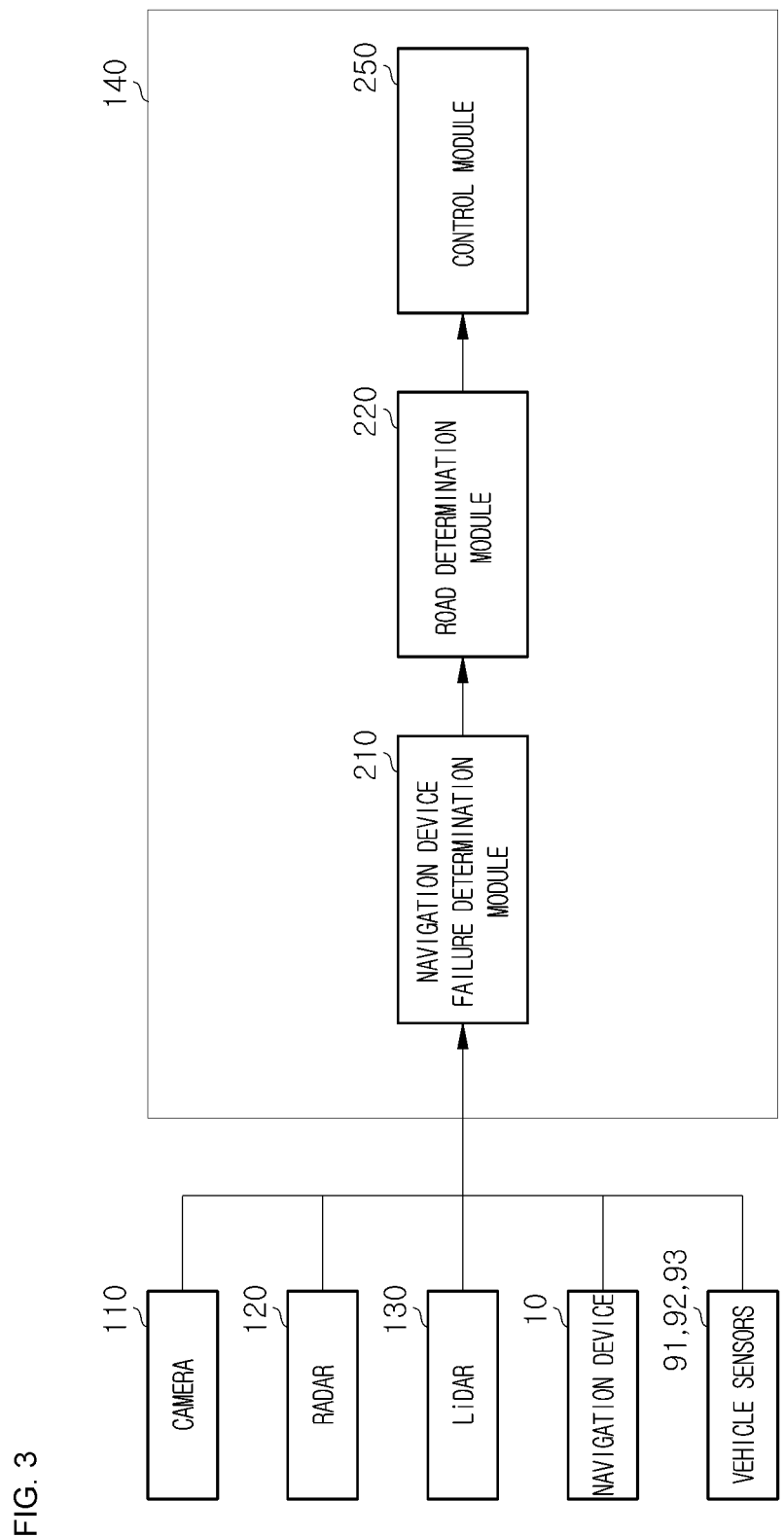
FIG. 3 is a view illustrating functional modules of a controller included in the driving assistance apparatus according to one embodiment.
Figure 4:
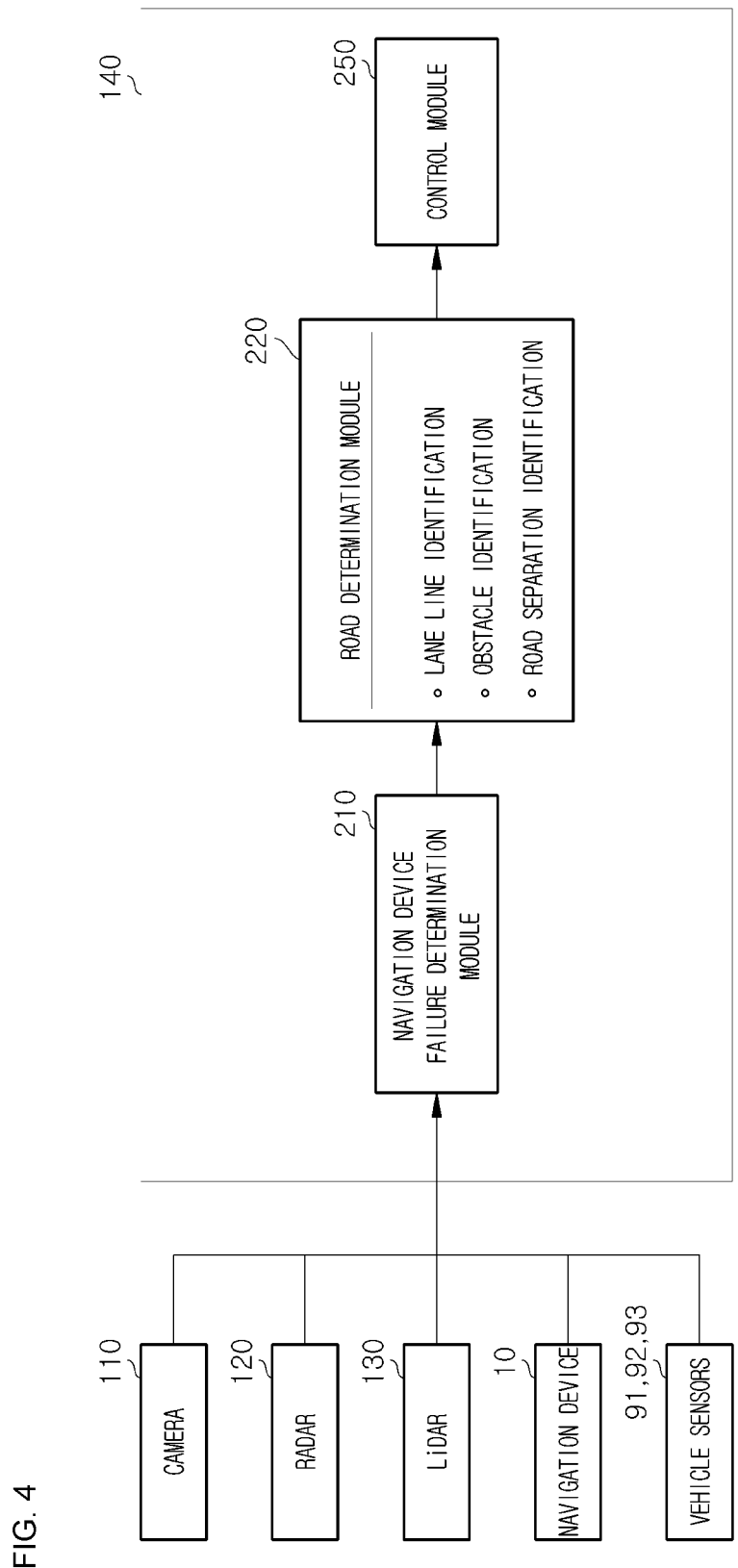
FIG. 4 is a view specifically illustrating a road determination module illustrated in FIG. 3.
Figure 5:
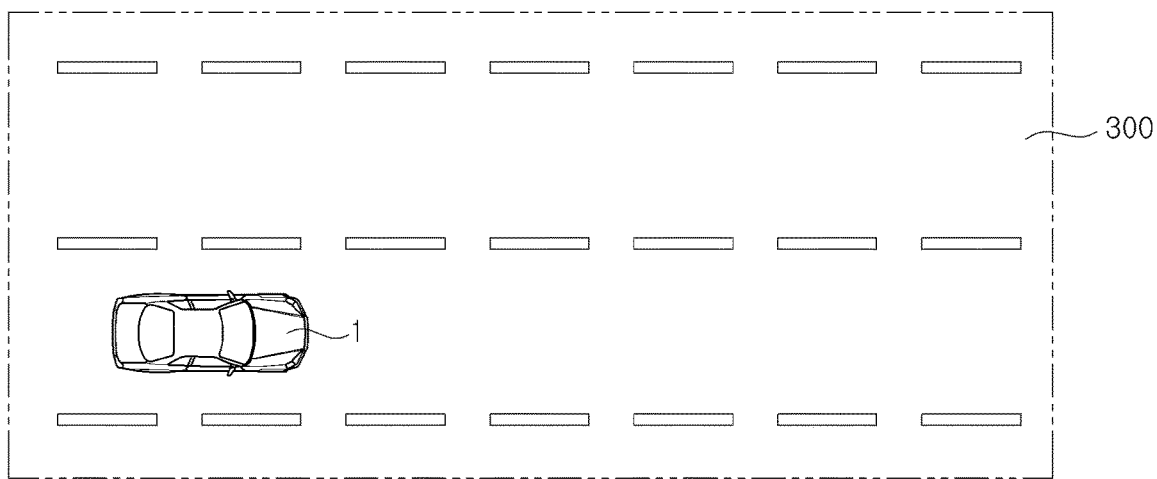
FIGS. 5 to 7 are views illustrating road conditions under which a lane change assistance function is operable.
Figure 6:
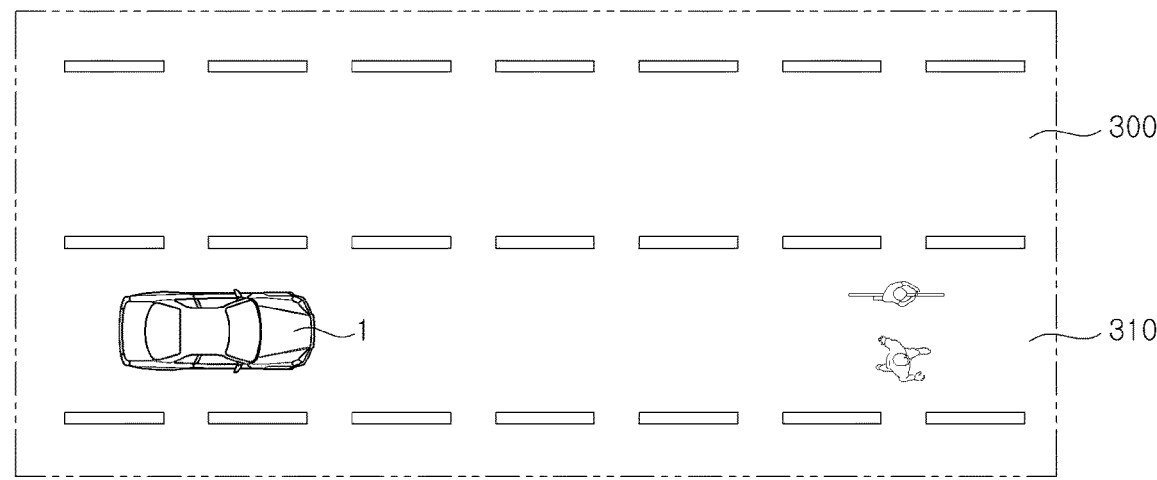
Figure 7:
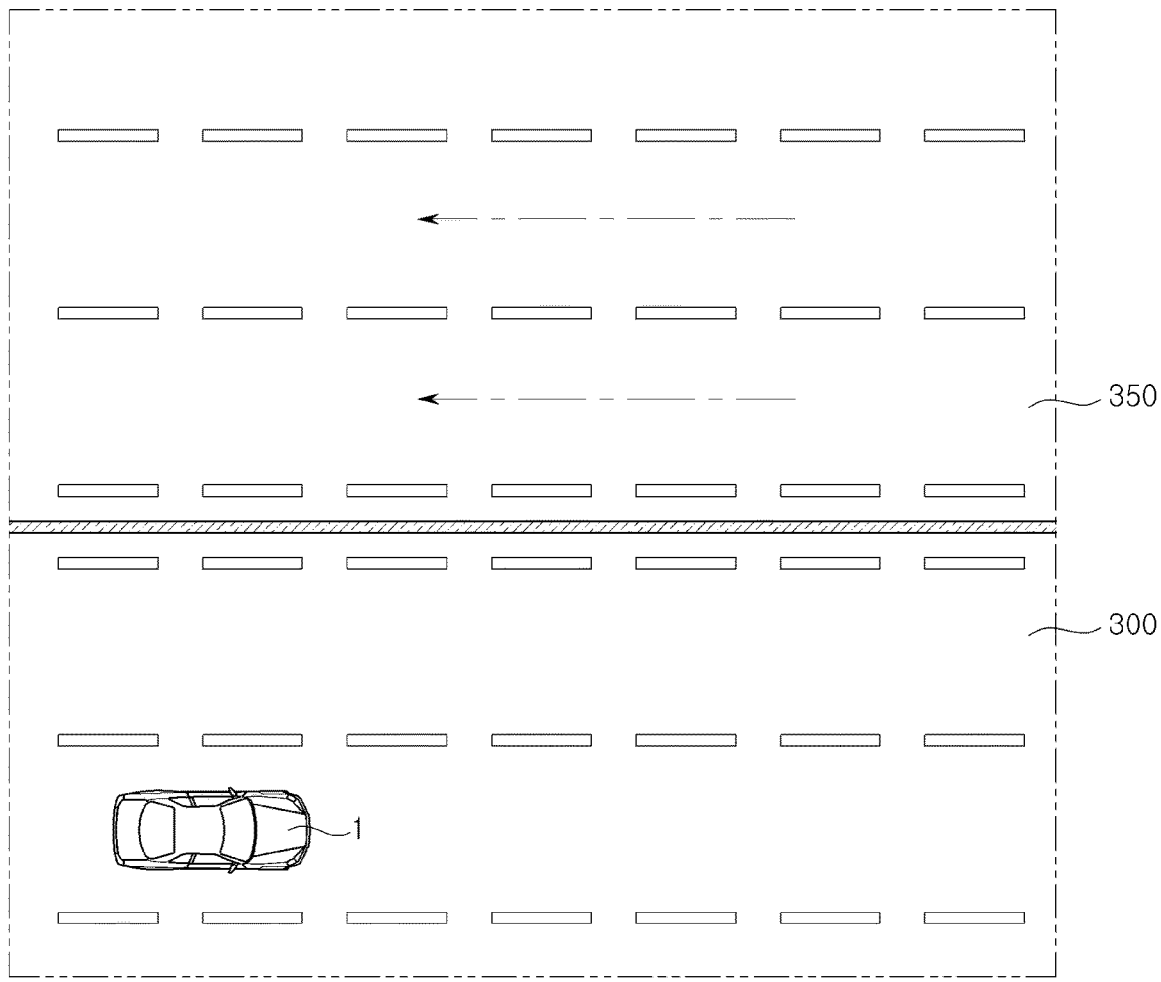

FIG. 3 is a view illustrating functional modules of a controller included in the driving assistance apparatus according to one embodiment. FIG. 4 is a view specifically illustrating a road determination module illustrated in FIG. 3. FIGS. 5 to 7 are views illustrating road conditions under which a lane change assistance function is operable.

The controller 140 may functionally include a plurality of modules. Each of the modules may be a hardware module (e.g., an application specific integrated circuit (ASIC) or a field programmable gate array (FPGA)) included in the processor 142 or a software module (e.g., an application program or data) stored in the memory 141.

As illustrated in FIG. 3, the controller 140 may include the navigation device 10 failure determination module (hereinafter referred to as "failure determination module") 210, a road determination module 220, and a control module 250.

The failure determination module 210 of the controller 140 may determine whether the navigation device 10 is in a failure or abnormal state. When an original function provided by the navigation device 10 may not be normally provided or when data necessary for implementing the original function provided by the navigation device 10 is not normally received or acquired, it may be determined that the navigation device 10 is in the failure or abnormal state.

That is, the failure determination module 210 may monitor the operation of the navigation device 10 or receive data on the operation of the navigation device 10 and determine whether the navigation device 10 is in the failure or abnormal state.

The failure determination module 210 may transmit a determination result on whether the navigation device 10 fails to the road determination module 220. The road determination module 220 determines data to be used among the data of the navigation device 10 and the data of the front sensors upon determining whether the travel road is a road on which the lane change assistance function is operable according to a result of determining whether the navigation device 10 is in the failure or abnormal state, which is received from the failure determination module 210.

The road determination module 220 may determine whether the road on which the vehicle is traveling is the road on which the lane change assistance function is operable. As described above, the road determination module 220 according to the disclosed embodiment may determine whether the travel road is the road on which the lane change assistance function is operable using the data of the navigation device 10 or the data of the front sensors.

In order to determine whether the travel road is the road on which the lane change assistance function is operable, the road determination module 220 identifies lane lines of the travel road, identifies obstacles on the travel road, and identifies whether the travel road is separated from an opposite road 350.

That is, as illustrated in FIG. 5, the road determination module 220 identifies lane lines on a travel road 300 and determines whether two or more lane lines are present on the travel road 300. In order to operate the lane change assistance function, two or more lane lines should be present on the travel road 300. Therefore, the road determination module 220 determines whether the travel road 300 is a road having two or more lane lines using the data of the navigation device 10 or the data of the front sensors.

As a determination result of the failure determination module 210, when the navigation device 10 normally operates, the road determination module 220 determines whether two or more lane lines are present on the travel road 300 using the data of the navigation device 10.

As the determination result of the failure determination module 210, when the navigation device 10 is in a failure or abnormal state, the road determination module 220 determines whether two or more lane lines are present on the travel road 300 using the data of the front sensors.

When two or more lane lines are not present on the travel road 300, the road determination module 220 determines that the lane change assistance function is not operable on the corresponding travel road 300 and may not perform obstacle identification and road separation identification. In this case, the control module 250 may not perform control related to the lane change assistance function.

Meanwhile, when two or more lane lines are present on the travel road 300, the road determination module 220 identifies obstacles on the travel road 300 and determines whether a pedestrian or cyclist 310 is present on the travel road 300 as illustrated in FIG. 6. In order to operate the lane change assistance function, as illustrated in FIG. 6, there should be no pedestrian or cyclist 310 on the travel road 300. Therefore, the road determination module 220 determines whether a pedestrian or cyclist 310 is present on the travel road 300 using the data of the navigation device 10 or the data of the front sensors.

As the determination result of the failure determination module 210, when the navigation device 10 normally operates, the road determination module 220 may determine whether the travel road 300 is a highway or an expressway on which the pedestrian 310 may not walk or the cyclist 310 may not travel using the data of the navigation device 10. However, even when the navigation device 10 normally operates, the data of the front sensors may be used to directly check whether the pedestrian or cyclist 310 is present on the travel road.

As the determination result of the failure determination module 210, when the navigation device 10 is in the failure or abnormal state, the road determination module 220 may determine whether the pedestrian or cyclist 310 are present on the travel road 300 using the data of the front sensors.

When the travel road 300 is not the highway or the expressway or the pedestrian or cyclist 310 is present on the travel road 300, the road determination module 220 determines that the lane change assistance function is not operable on the corresponding travel road 300 and may not perform the road separation identification. In this case, the control module 250 may not perform control related to the lane change assistance function.

Meanwhile, when two or more lane lines are present on the travel road 300 and no pedestrian or cyclist 310 is present on the travel road 300, the road determination module 220 determines whether the travel road 300 is separated from the opposite road 350 of the travel road. The road determination module 220 identifies the opposite road 350 of the travel road 300 and determines whether the opposite road 350 is separated from the travel road 300 by a specific boundary such as a center line or a median strip as illustrated in FIG. 7.

In order to operate the lane change assistance function, as illustrated in FIG. 7, the travel road 300 should be separated from the opposite road 350. Therefore, the road determination module 220 acquires information on the opposite road 350 using the data of the navigation device 10 or the data of the front sensors and determines whether the opposite road 350 is separated from the travel road 300 based on the information.

As the determination result of the failure determination module 210, when the navigation device 10 normally operates, the road determination module 220 may determine whether the travel road 300 is separated from the opposite road 350 of the travel road 300 using the data of the navigation device 10. However, even when the navigation device 10 normally operates, data including information on oncoming vehicles acquired from the front sensors or the like may be used to directly check whether the opposite road 350 of the travel road 300 is separated from the travel road 300.

As the determination result of the failure determination module 210, when the navigation device 10 is in the failure or abnormal state, the road determination module 220 may acquire information on the opposite road 350 of the travel road 300 using the data of the front sensors and determine whether the opposite road 350 is separated from the travel road 300 based on the information.

When the opposite road 350 of the travel road 300 is not separated from the travel road 300, the road determination module 220 may determine that the lane change assistance function is not operable on the corresponding travel road 300. In this case, the control module 250 may not perform control related to the lane change assistance function.

Meanwhile, when it is determined that two or more lane lines are present on the travel road 300, there is no pedestrian or cyclist 310 on the travel road 300, and the opposite road 350 of the travel road 300 is separated from the travel road 300, the road determination module 220 may determine that the corresponding travel road 300 is the road on which the lane change assistance function is operable and transmit the determination result to the control module 250.

When all of the above-described three conditions are satisfied, the road determination module 220 determines that the corresponding road is the road on which the lane change assistance function is operable. Meanwhile, it is first determined whether two or more lane lines are present on the traveling lane, and when the travel road 300 does not satisfy the corresponding conditions, other conditions may not be determined.

Meanwhile, as the determination result of the failure determination module 210, when the navigation device 10 is in the failure or abnormal state, the road determination module 220 may maintain, based on road state information determined before a failure of the navigation device 10, a road state according to the road state information as a state of the travel road for a predetermined time. That is, when it is determined that the navigation device 10 is in the failure or abnormal state, the road determination module 220 may determine the road state according to the road state information determined before the failure of the navigation device 10 as the state of the travel road for the predetermined time before performing determination using the data of the front sensors.

When it is determined that the travel road 300 is the road on which the lane change assistance function is operable, the control module 250 may perform control related to the execution of the lane change assistance function. The control module 250 may directly perform the control related to the lane change assistance function, or transmit the above-described determination information on the travel road 300 to a separate controller for performing the lane change assistance function so that the corresponding controller may perform the control related to the lane change assistance function.

More specifically, when the road determination module 220 determines that the travel road 300 is the road on which the lane change assistance function is operable, the control module 250 or the controller for performing the lane change assistance function becomes a ready state. In the ready state, when receiving a confirmation instruction for activating the lane change assistance function from a driver, the control module 250 or the above-described controller activates the lane change assistance function.

Figure 8:
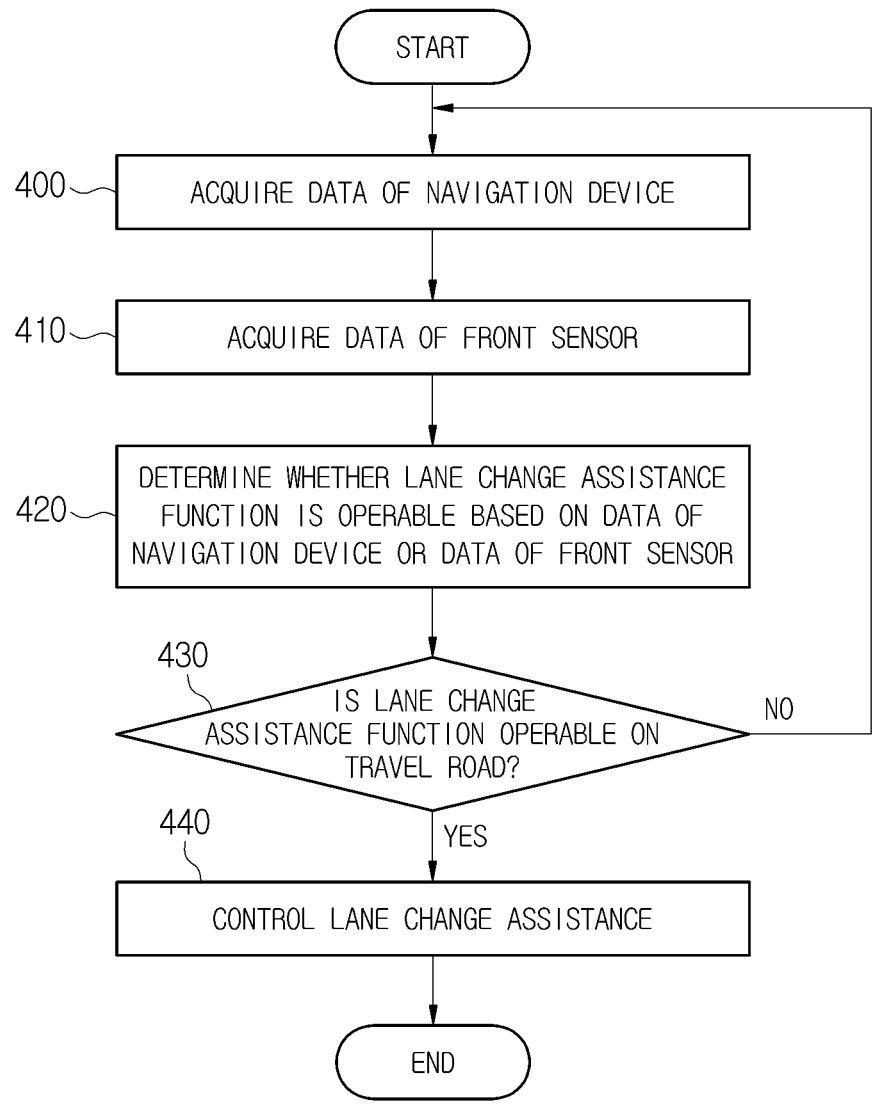
FIGS. 8, 9 and 10 are views for describing an operation of the driving assistance apparatus according to one embodiment.
Figure 10:
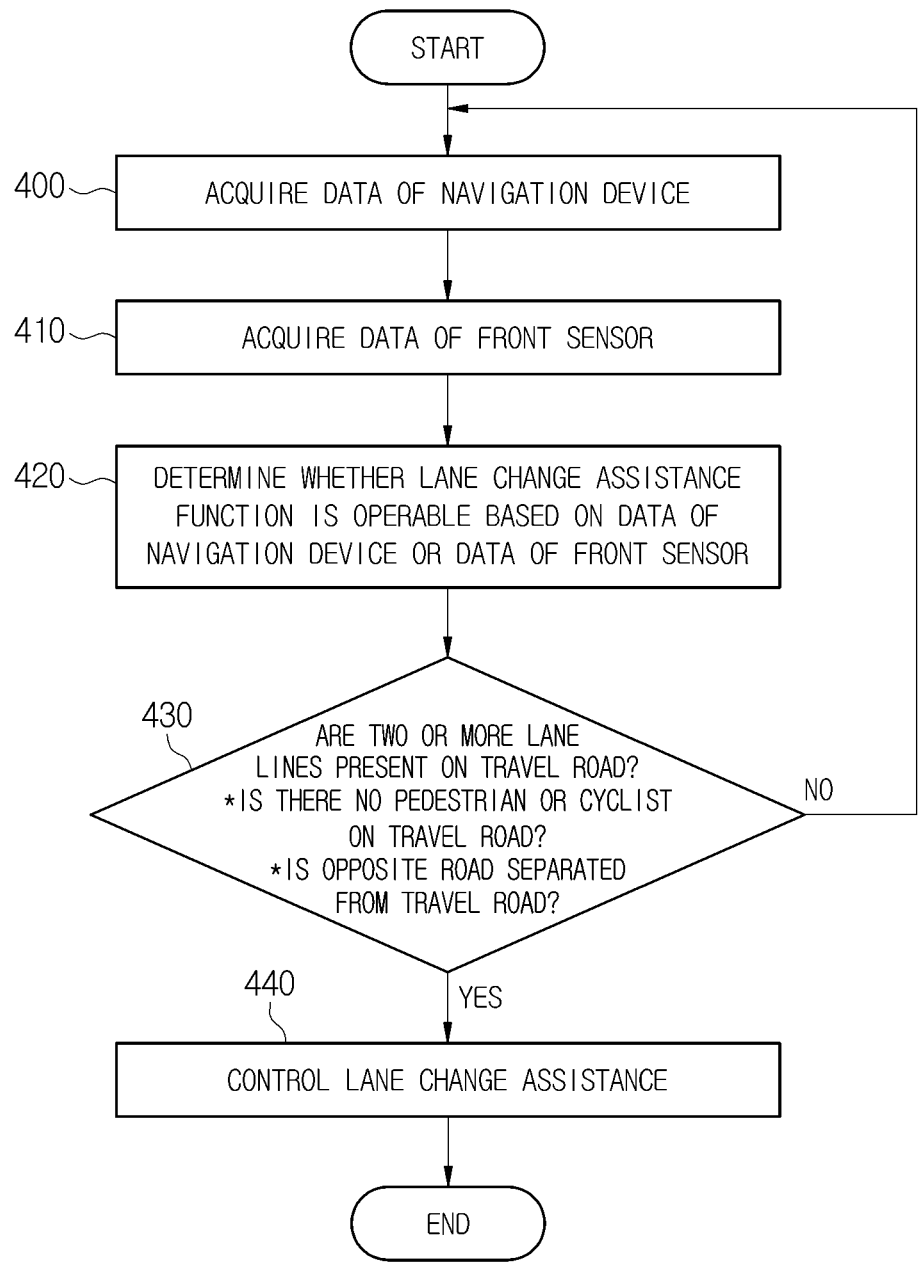

FIGS. 8 and 10 are views for describing an operation of the driving assistance apparatus according to one embodiment.

Referring to FIG. 8, the controller 140 acquires data from the navigation device 10 and front sensors (400 and 410) and determines whether the travel road 300 is the road on which the lane change assistance function is operable based on the data of the navigation device 10 or the data of the front sensors (420).

Figure 9:
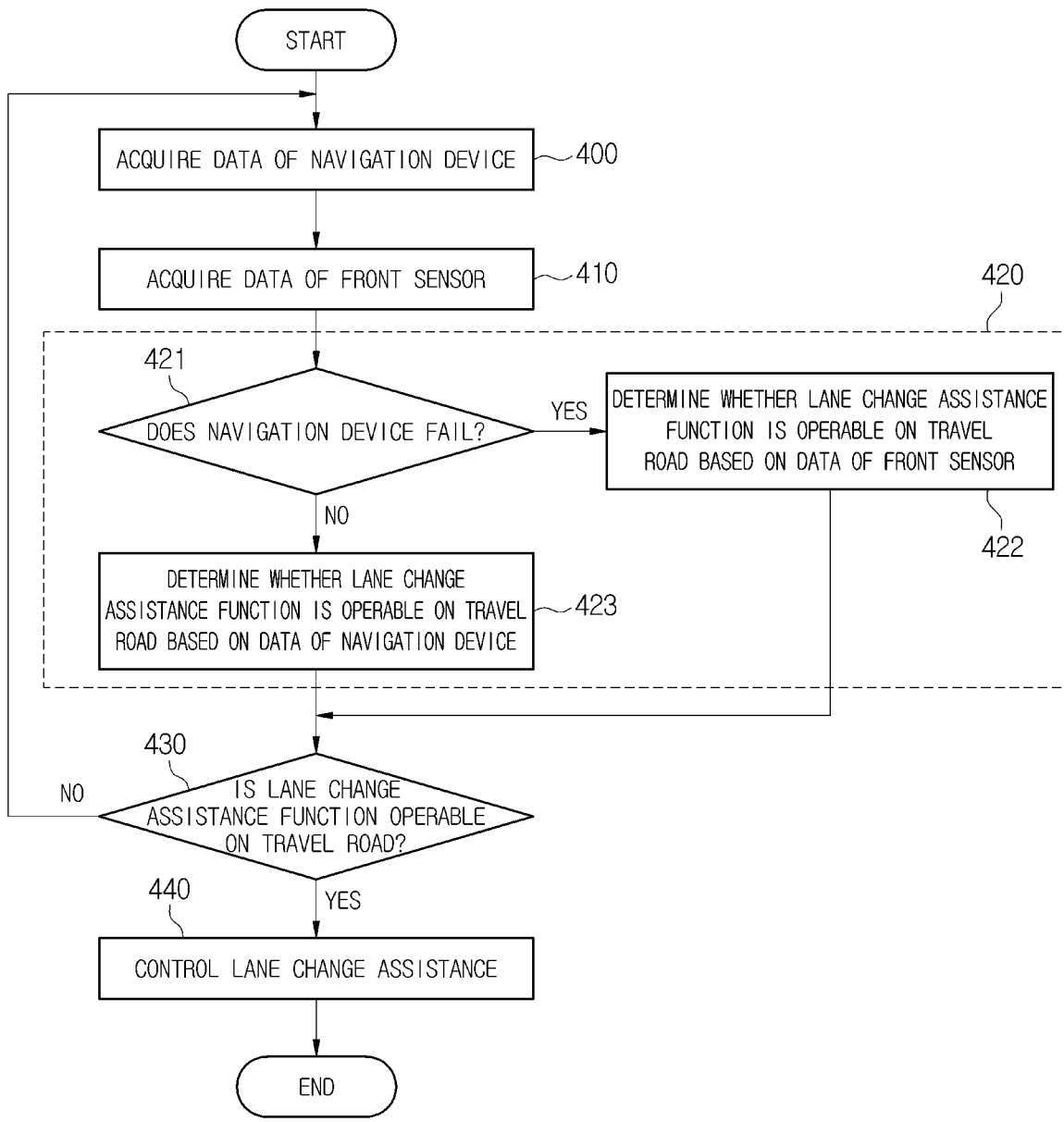

More specifically, referring to FIG. 9, the controller 140 determines whether the navigation device 10 fails (421), determines whether the travel road 300 is the road on which the lane change assistance function is operable based on the data of the front sensors when the navigation device 10 is in the failure state (422), and determines whether the travel road 300 is the road on which the lane change assistance function is operable based on the data of the navigation device 10 when the navigation device 10 normally operates (423).

The controller 140 may determine whether the navigation device 10 is in the failure or abnormal state. When an original function provided by the navigation device 10 may not be normally provided or when data necessary for implementing the original function provided by the navigation device 10 is not normally received or acquired, it may be determined that the navigation device 10 is in the failure or abnormal state.

That is, the controller 140 may monitor the operation of the navigation device 10 or receive data on the operation of the navigation device 10 and determine whether the navigation device 10 is in the failure or abnormal state.

The controller 140 determines data to use among the data of the navigation device 10 and the data of the front sensors upon determining whether the travel road 300 is the road on which the lane change assistance function is operable according to a result of determining whether the navigation device 10 fails.

Referring to FIG. 8, as described above, the controller 140 determines whether the lane change assistance function is operable on the travel road 300 using the data of the navigation device 10 or the data of the front sensors according to whether the navigation device 10 fails (430) and perform control related to the execution of the lane change assistance function when the lane change assistance function is operable on the travel road 300 (440).

Referring to FIG. 10 illustrating the determination in operation 430 in FIG. 8 in more detail, the controller 140 determines that the lane change assistance function is operable on the travel road 300 when two or more lane lines are present on the travel road 300, there is no pedestrian or cyclist 310 on the travel road 300 and the opposite road 350 is separated from the travel road 300 (430), and performs the control related to the lane change assistance function (440).

The controller 140 may determine whether the road on which the vehicle is traveling is the road on which the lane change assistance function is operable. As described above, the controller 140 according to the disclosed embodiment may determine whether the travel road 300 is the road on which the lane change assistance function is operable using the data of the navigation device 10 or the data of the front sensors.

In order to determine whether the travel road 300 is the road on which the lane change assistance function is operable, the controller 140 identifies lane lines of the travel road 300, identifies obstacles on the travel road 300, and identifies whether the travel road 300 is separated from the opposite road 350.

That is, as illustrated in FIG. 5, the controller 140 identifies the lane lines on the travel road 300 and determines whether two or more lane lines are present on the travel road 300. In order to operate the lane change assistance function, two or more lane lines should be present on the travel road 300. Therefore, the controller 140 determines whether the travel road 300 is the road having two or more lane lines using the data of the navigation device 10 or the data of the front sensors.

When the navigation device 10 normally operates, the controller 140 determines whether two or more lane lines are present on the travel road 300 using the data of the navigation device 10.

When the navigation device 10 is in the failure or abnormal state, the controller 140 determines whether two or more lane lines are present on the travel road 300 using the data of the front sensors.

When two or more lane lines are not present on the travel road 300, the controller 140 determines that the lane change assistance function is not operable on the corresponding travel road 300 and may not perform obstacle identification and road separation identification. In this case, the controller 140 may not perform the control related to the lane change assistance function.

Meanwhile, when two or more lane lines are present on the travel road 300, the controller 140 identifies obstacles on the travel road 300 and determines whether the pedestrian or cyclist 310 is present on the travel road 300 as illustrated in FIG. 6. In order to operate the lane change assistance function, as illustrated in FIG. 6, there should be no pedestrian or cyclist 310 on the travel road 300. Therefore, the controller 140 determines whether the pedestrian or cyclist 310 is present on the travel road 300 using the data of the navigation device 10 or the data of the front sensors.

When the navigation device 10 normally operates, the controller 140 may determine whether the travel road 300 is a highway or an expressway on which the pedestrian 310 may not walk or the cyclist 310 may not travel using the data of the navigation device 10. However, even when the navigation device 10 normally operates, the data of the front sensors may be used to directly check whether the pedestrian or cyclist 310 is present on the travel road.

When the navigation device 10 is in the failure or abnormal state, the controller 140 may determine whether the pedestrian or cyclist 310 is present on the travel road 300 using the data of the front sensors.

When the travel road 300 is not the highway and the expressway or the pedestrian or cyclist 310 is present on the travel road 300, the controller 140 determines that the lane change assistance function is not operable on the corresponding travel road 300 and may not perform the road separation identification. In this case, the controller 140 may not perform the control related to the lane change assistance function.

Meanwhile, when two or more lane lines are present on the travel road 300 and no pedestrian or cyclist 310 is present on the travel road 300, the controller 140 determines whether the travel road 300 is separated from the opposite road 350 of the travel road 300. The controller 140 identifies the opposite road 350 of the travel road 300 and determines whether the opposite road 350 is separated from the travel road 300 by a specific boundary such as a center line or a median strip as illustrated in FIG. 7.

In order to operate the lane change assistance function, as illustrated in FIG. 7, the travel road 300 should be separated from the opposite road 350. Therefore, the controller 140 acquires information on the opposite road 350 using the data of the navigation device 10 or the data of the front sensors and determines whether the opposite road 350 is separated from the travel road 300 based on the information.

When the navigation device 10 normally operates, the controller 140 may determine whether the opposite road 350 of the travel road 300 is separated from the travel road 300 using the data of the navigation device 10. However, even when the navigation device 10 normally operates, data including information on opposite vehicles acquired from the front sensors or the like may be used to directly check whether the opposite road 350 of the travel road 300 is separated from the travel road 300.

When the navigation device 10 is in the failure or abnormal state, the controller 140 may acquire information on the opposite road 350 of the travel road 300 using the data of the front sensors and determine whether the opposite road 350 is separated from the travel road 300 based on the information.

When the opposite road 350 of the travel road 300 is not separated from the travel road 300, the controller 140 may determine that the lane change assistance function is not operable on the corresponding travel road 300. In this case, the controller 140 may not perform the control related to the lane change assistance function.

Meanwhile, when it is determined that two lane lines are present on the travel road 300, there is no pedestrian or cyclist 310 on the travel road 300, and the opposite road 350 of the travel road 300 is separated from the travel road 300, the controller 140 may determine that the corresponding travel road 300 is the road on which the lane change assistance function is operable.

When all of the above-described three conditions are satisfied, the controller 140 determines that the corresponding road is the road on which the lane change assistance function is operable. Meanwhile, it is first determined whether two or more lane lines are present on the traveling lane, and when the travel road 300 does not satisfy the corresponding conditions, other conditions may not be determined.

Meanwhile, when the navigation device 10 is in the failure or abnormal state, the controller 140 may maintain, based on road state information determined before a failure of the navigation device 10, a road state according to the road state information as a state of the travel road for a predetermined time. That is, when it is determined that the navigation device 10 is in the failure or abnormal state, the controller 140 may determine the road state according to the road state information determined before the failure of the navigation device 10 as the state of the travel road for the predetermined time before performing determination using the data of the front sensors.

When it is determined that the travel road 300 is the road on which the lane change assistance function is operable, the controller 140 may perform the control related to the execution of the lane change assistance function. The controller 140 may directly perform the control related to the lane change assistance function, and transmit the above-described determination information on the travel road 300 to a separate controller for performing the lane change assistance function so that the corresponding controller may perform the control related to the lane change assistance function.

More specifically, when the controller 140 determines that the travel road 300 is the road on which the lane change assistance function is operable, the controller 140 or the controller for performing the lane change assistance function becomes a ready state. In the ready state, when receiving a confirmation instruction for activating the lane change assistance function from a driver, the controller 140 or the above-described controller activates the lane change assistance function.

As is apparent from the above description, a driving assistance apparatus according to the disclosed embodiment can detect unexpected risk factors in advance to transmit many pieces of information to a driver and allow the driver to constantly keep an eye on the risk factors for immediate intervention. In addition, since the driver determines the determination about potential risk factors, it is possible to reduce risk due to incorrect determination of autonomous driving. In addition, it is possible to give a driver confidence in terms of the safety of autonomous driving vehicles by actively notifying the driver of risk factors having a collision possibility.

According to one aspect of the present disclosure, it is possible to determine whether a travel road is a road capable of providing a lane change assistance function using information acquired from sensors capable of detecting front images of a vehicle when a navigation device is in an abnormal state.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for driving assistance, the apparatus comprising:
 a front sensor installed on a vehicle and having a field of sensing outside the vehicle; and
 a controller configured to process data acquired from a navigation device of the vehicle and data acquired from the front sensor,
 wherein the controller is configured to:
 determine whether the navigation device fails;
 maintain, based on road state information determined before a failure of the navigation device, a road state according to the road state information as a state of the travel road for a predetermined time when the navigation device fails; and
 after the predetermined time elapses, determine, based on the data acquired from the front sensor, whether a travel road is a road on which a lane change assistance function is operable when the navigation device fails.

2. The apparatus of claim 1, wherein the front sensor comprises:
a camera installed on the vehicle, having a field of view outside the vehicle, and configured to acquire image data; and
a radar installed on the vehicle, having a field of sensing outside the vehicle, and configured to acquire radar data.

3. The apparatus of claim 1, wherein the controller is configured to determine whether two or more lane lines are present on a road in a traveling direction based on the data acquired from the front sensor.

4. The apparatus of claim 1, wherein the controller is configured to determine whether at least one of a pedestrian or a cyclist is present on the travel road based on the data acquired from the front sensor.

5. The apparatus of claim 1, wherein the controller is configured to determine whether a road in a direction opposite to a direction of the travel road is separated from the travel road based on the data acquired from the front sensor.

6. The apparatus of claim 1, wherein the controller is configured to determine that the travel road is the road on which the lane change assistance function is operable when it is determined that two or more lane lines are present on the travel road, there is no pedestrian and no cyclist on the travel road, and a road in a direction opposite to a direction of the travel road is separated from the travel road based on the data acquired from the front sensor.

7. The apparatus of claim 1, wherein the controller is configured to determine, based on the data of the navigation device, whether the travel road is the road on which the lane change assistance function is operable when the navigation device is normal.

8. The apparatus of claim 1, wherein the controller is configured to determine that the travel road is the road on which the lane change assistance function is operable when it is determined that two or more lane lines are present on the travel road based on the data of the navigation device when the navigation device is normal and it is determined that there is no pedestrian or cyclist on the travel road and a road in a direction opposite to a direction of the travel road is separated from the travel road using the data acquired from the front sensor.

9. The apparatus of claim 1, wherein the controller is configured to perform control for lane change assistance when it is determined that the travel road is the road on which the lane change assistance function is operable.

10. A method for driving assistance, the method comprising:
acquiring data from a navigation device of a vehicle;
acquiring data through a front sensor having a field of sensing outside the vehicle;
determining whether the navigation device fails based on the data acquired from the navigation device;
maintain, based on road state information determined before a failure of the navigation device, a road state according to the road state information as a state of the travel road for a predetermined time when the navigation device fails; and
after the predetermined time elapses, determining, based on the data acquired from the front sensor, whether a travel road is a road on which a lane change assistance function is operable when the navigation device fails.

11. The method of claim 10, wherein the front sensor comprises:
a camera installed on the vehicle, having a field of view outside the vehicle, and configured to acquire image data; and
a radar installed on the vehicle, having a field of sensing outside the vehicle, and configured to acquire radar data.

12. The method of claim 10, wherein the determining of whether the travel road is the road on which the lane change assistance function is operable comprises determining whether two or more lane lines are present on the travel road based on the data acquired from the front sensor.

13. The method of claim 10, wherein the determining of whether the travel road is the road on which the lane change assistance function is operable comprises determining whether at least one of a pedestrian or a cyclist is present on the travel road based on the data acquired from the front sensor.

14. The method of claim 10, wherein the determining of whether the travel road is the road on which the lane change assistance function is operable comprises determining whether a road in a direction opposite to a direction of the travel road is separated from the travel road based on the data acquired from the front sensor.

15. The method of claim 10, wherein the determining of whether the travel road is the road on which the lane change assistance function is operable comprises determining that the travel road is the road on which the lane change assistance function is operable when it is determined that two or more lane lines are present on the travel road, there is no pedestrian or cyclist on the travel road, and a road in a direction opposite to a direction of the travel road is separated from the travel road based on the data acquired from the front sensor.

16. The method of claim 10, wherein the determining of whether the travel road is the road on which the lane change assistance function is operable comprises determining, based on the data of the navigation device, whether the travel road is the road on which the lane change assistance function is operable when the navigation device is normal.

17. The method of claim 10, wherein the determining of whether the travel road is the road on which the lane change assistance function is operable comprises determining that the travel road is the road on which the lane change assistance function is operable when it is determined that two or more lane lines are present on the travel road based on the data of the navigation device when the navigation device is normal and it is determined that there is no pedestrian or cyclist on the travel road and a road in a direction opposite to a direction of the travel road is separated from the travel road based on the data acquired from the front sensor.

18. The method of claim 10, further comprising performing control for lane change assistance when it is determined that the travel road is the road on which the lane change assistance function is operable.

19. An apparatus for driving assistance, the apparatus comprising:
a front sensor installed on a vehicle and having a field of sensing outside the vehicle; and
a controller configured to process data acquired from a navigation device of the vehicle and data acquired from the front sensor,
wherein the controller is configured to:
determine whether the navigation device fails; and when the navigation device fails, determine, based on the data acquired from the front sensor, whether a travel road is a road on which a lane change assistance function is operable by:
    determining whether two or more lane lines are present on the travel road,
    determining whether at least one of a pedestrian or a cyclist is present on the travel road, and
    determining whether a road in a direction opposite to a direction of the travel road is separated from the travel road,
wherein the controller is configured to determine that the travel road is the road on which the lane change assistance function is operable only when all of the following conditions are concurrently satisfied: two or more lane lines are present on the travel road, there is no pedestrian and no cyclist on the travel road, and the road in the direction opposite to the direction of the travel road is separated from the travel road.

20. A method for driving assistance, the method comprising:
    acquiring data from a navigation device of a vehicle;
    acquiring data through a front sensor having a field of sensing outside the vehicle;
    determining whether the navigation device fails based on the data acquired from the navigation device; and
    when the navigation device fails, determining, based on the data acquired from the front sensor, whether a travel road is a road on which a lane change assistance function is operable by:
        determining whether two or more lane lines are present on the travel road,
        determining whether at least one of a pedestrian or a cyclist is present on the travel road, and
        determining whether a road in a direction opposite to a direction of the travel road is separated from the travel road,
    wherein the determining comprises determining that the travel road is the road on which the lane change assistance function is operable only when all of the following conditions are concurrently satisfied: two or more lane lines are present on the travel road, there is no pedestrian and no cyclist on the travel road, and the road in the direction opposite to the direction of the travel road is separated from the travel road.

* * * * *